(12) United States Patent
Vandezande et al.

(10) Patent No.: US 10,011,703 B2
(45) Date of Patent: *Jul. 3, 2018

(54) WATER BORNE EPOXY RESIN DISPERSIONS AND EPOXY HARDENER COMPOSITIONS

(71) Applicant: Ethox Chemicals, LLC, Greenville, SC (US)

(72) Inventors: Gerald Vandezande, Greenville, SC (US); Charles F. Palmer, Jr., Greenville, SC (US); Edward R. Godwin, Greenville, SC (US)

(73) Assignee: ETHOX CHEMICALS, LLC, Greenville, SC (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/792,059

(22) Filed: Mar. 9, 2013

(65) Prior Publication Data

US 2014/0256852 A1 Sep. 11, 2014

Related U.S. Application Data

(60) Provisional application No. 61/609,056, filed on Mar. 9, 2012, provisional application No. 61/761,112, filed on Feb. 5, 2013.

(51) Int. Cl.
*C08K 5/13* (2006.01)
*C08K 5/41* (2006.01)
*C08K 5/521* (2006.01)

(52) U.S. Cl.
CPC ............... *C08K 5/13* (2013.01); *C08K 5/41* (2013.01); *C08K 5/521* (2013.01)

(58) Field of Classification Search
CPC ................................ C08L 63/00; C08K 5/13
USPC ........................................................ 523/400
See application file for complete search history.

(56) References Cited

U.S. PATENT DOCUMENTS

| | | | | |
|---|---|---|---|---|
| 4,842,776 A * | 6/1989 | Schmidt | ............... | C09K 8/584 562/42 |
| 5,009,668 A * | 4/1991 | Berendt | ............... | D06P 1/6131 510/535 |
| 6,736,892 B2 * | 5/2004 | Godwin et al. | ............... | 106/499 |
| 2003/0211128 A1 * | 11/2003 | Martin | ................... | A01N 25/04 424/405 |
| 2005/0256262 A1 * | 11/2005 | Hill | ..................... | C09D 7/1291 524/702 |
| 2005/0261401 A1 * | 11/2005 | Wood | ................... | C07D 401/14 524/99 |
| 2009/0092847 A1 * | 4/2009 | Onoe | ..................... | B32B 27/08 428/500 |
| 2009/0170983 A1 * | 7/2009 | Tada et al. | ..................... | 524/95 |
| 2009/0264578 A1 * | 10/2009 | Minaki et al. | ................ | 524/502 |
| 2011/0223125 A1 * | 9/2011 | Hough | ................. | A61K 8/8152 424/70.12 |
| 2013/0047892 A1 * | 2/2013 | Palmer, Jr. | ............. | C07C 43/23 106/287.23 |
| 2013/0295499 A1 * | 11/2013 | Murata | ................ | G03G 9/0804 430/105 |
| 2014/0114006 A1 * | 4/2014 | Palmer, Jr. | .......... | C09D 171/02 524/458 |

OTHER PUBLICATIONS www.adishank.com/sp.html as acessed via archive.org, Sep. 12, 2011 version.*

* cited by examiner

*Primary Examiner* — Megan McCulley
(74) *Attorney, Agent, or Firm* — Joseph T. Guy; Patent Filing Specialist, Inc.

(57) ABSTRACT

An epoxy or hardener mixture comprising (a) optionally water, (b) at least one hardener or epoxy resin, and (c) from 0.1 to 20 weight percent, based on epoxy resin of at least one distyryl phenol, tristyryl phenol or cumylphenol based additive surfactant with phosphate or sulfonate end groups having the structure R—OXn-W wherein R designates a polystyrylphenol or cumylphenol, preferentially chosen from among distyrylphenol, tristyrylphenol or cumylphenol, and mixtures thereof, and wherein OX designates ethylene oxide and/or propylene oxide. The number of groups "n" varies from 0 to 200, and W designates H, sulfate ($-SO_3^-$) or phosphate ($-PO_3H$ or $-PO_2-OXnR$). Freeze thaw resistance and improved stability is obtained in epoxy mixtures used in dispersion form. Improved pot life and cure time is obtained using either the epoxy mixture, the hardener mixture or a combination of the two in epoxy hardener formulations.

24 Claims, 1 Drawing Sheet

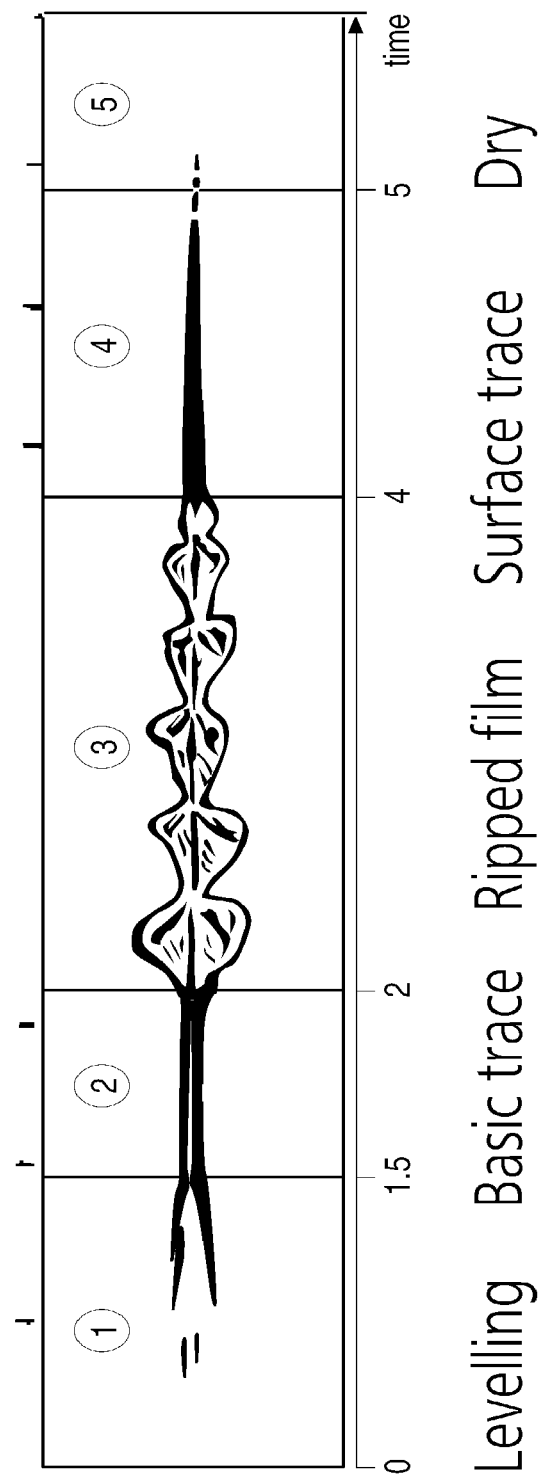

WATER BORNE EPOXY RESIN DISPERSIONS AND EPOXY HARDENER COMPOSITIONS

This application claims the priority benefit under 35 U.S.C. section 119 of U.S. Provisional Patent Application Nos. 61/609,056 entitled "Water Borne Epoxy Resin Dispersions" filed on Mar. 9, 2012; and 61/761,112 entitled "Epoxy Hardener Containing Styrenated Phenols" filed Feb. 5, 2013, which are in their entirety herein incorporated by reference.

FIELD OF THE INVENTION

The present invention relates to epoxy resins, water borne epoxy resin dispersions and epoxy hardeners. The invention also relates to improved aqueous dispersions of epoxy resins, which provide improved properties and a process to prepare such dispersions. This invention also relates to a novel aqueous epoxy resin dispersions incorporating novel additives such as styrenated phenols.

This invention further relates to epoxide resin hardening agents. The present invention also describes certain hardening agents and to a method for making epoxide polyadducts therewith, and to the polyadducts so made. The instant invention also relates to hardeners characterized by a relatively long pot life and relatively short hardening time.

BACKGROUND OF THE INVENTION

Epoxy resins contain a number of the reactive oxirane ring structures commonly called "epoxy." The most commonly used resins are derivatives of bisphenol A and epichlorohydrin shown in structure I below. However, other types of resins (for example bisphenol F type) are also common to achieve various properties.

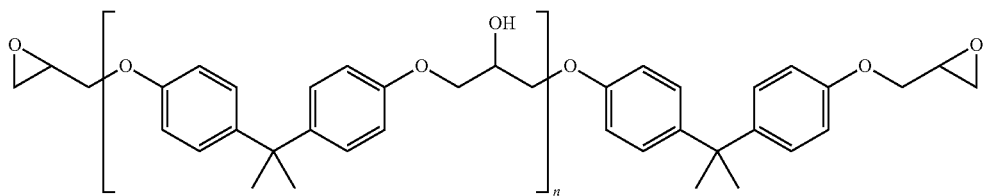

I

Epoxy coatings are formed by the reaction of a poly(epoxide)-based oligomer or resin with a polyfunctional active hydrogen compound hardener or curing agent. This curing reaction crosslinks the epoxy resin polymer and solidifies it into a durable coating. The focus of this invention is two component or 2K systems, with separate epoxy and polyamine hardeners (a polyamine pre-reacted with some epoxy or dimer fatty acid curing agent).

Organic solvents have been used to manage viscosity and maintain compatibility between the epoxy resin and hardener components, but are VOCs. Water use is more environmentally friendly, but requires surfactants since epoxy resins are hydrophobic and water reactive and therefore incompatible with water.

Epoxy resins are also available in various molecular weights to provide unique properties to the final coating. Epoxy molecular weights of about 300 Daltons are generally liquid at room temperature; those of 500 molecular weight are semi-solid, while those of 700 and above are solid in the absence of solvent. Molecular weights much higher than those listed are also used. Epoxy resins also include hybrids such as epoxy alkyds, epoxy acrylics, epoxy silicone, epoxy silane, epoxy polyurethane, epoxy urethanes, and other modifications are also known. In order to reduce the viscosity of these epoxy resins and 2K blends to a typical viscosity for epoxy coating application of around 2000-4000 cps, dilution with a solvent is often needed. Benzyl alcohol is traditionally used to lower viscosity in solvent epoxy applications. This traditionally requires around 10% benzyl alcohol for viscosity reduction of the epoxy coating. An alternative zero volatile organic compound (VOC)-free epoxy viscosity modifier would be advantageous and preferential over benzyl alcohol.

Benzyl alcohol is also used to improve epoxy reactions by compatibilizing the amine hardener and epoxy. This also helps reduce amine blush. In one aspect of the invention, using certain members of a family of distyryl phenol, tristyryl phenol or cumylphenol ethoxylate-based products as additives to epoxy resins without water reduce the viscosity and modify the pot life and cure time as well as reducing or eliminating amine blush. These additives impart no or very low VOCs to the epoxy coating formulation.

Epoxy resins can alternately be dispersed in water to reduce viscosity without adding VOCs. One technical problem that arises is that epoxy resins are rather hydrophobic, and thus do not readily disperse in water. Therefore, surfactants were developed in the past that would disperse these hydrophobic resins in water. These dispersed resins, however, are not freeze/thaw stable.

Waterborne epoxy resins have been in the marketplace for many years. They are widely accepted as environmentally friendly alternatives to solvent-borne or high solids epoxy systems. They offer distinct advantages over solvent-based epoxy coatings for a number of environmental, safety, and health considerations. They have a lower or zero volatile organic compound (VOC) content which reduces their carbon footprint. Lower VOC formulations reduce air pollution and lead to lower odor, improving customer acceptance. Lower VOCs also contribute to decreased flammability and thus improved safety.

Beyond environmental benefits, waterborne epoxy dispersions also provide further technical advantages to the formulator and applicator. The water-based attribute of these epoxy resin dispersions allows water cleanup. Compared to high solids or 100% solids epoxy formulations, they have significantly lower viscosity contributing to ease of use. These water-dispersed epoxy resins can also be produced at higher molecular weight while maintaining low viscosity, improving flexibility over metal as compared to their high solids or 100% solids counterparts. These high molecular weight epoxy resins also improve set time or walk-on time as compared to solvent-based or high solids epoxies due to their ability to "lacquer dry." The most important applications for water-based epoxy systems today are coatings on concrete, primers for metal and epoxy cement concrete (ECC).

However, one of the problems with low-VOC waterborne epoxy and hardener dispersions is that the freeze/thaw stability of these dispersions is often poor since common anti-freeze solvents such as propylene glycol are VOCs. Another aspect of the instant invention provides a surfactant system comprising ethoxylates of distyrylphenol, tristyrylphenol or cumylphenol that imparts good freeze/thaw stability to epoxy dispersions. In addition, the stability and pot life of the dispersions are improved, without a concomitant extension of the cure time. This is unusual since pot life and cure time cannot usually be improved simultaneously. Gloss and water resistance of the cured coatings were checked and are good.

In addition, these distyrylphenol, tristyrylphenol or cumylphenol-based ethoxylate surfactants allow the preparation of aqueous epoxy resin dispersions that have good long-term stability at room temperature as well as at elevated temperatures. These dispersions are quite stable, retaining consistent viscosity over extended periods. They also impart good freeze/thaw resistance.

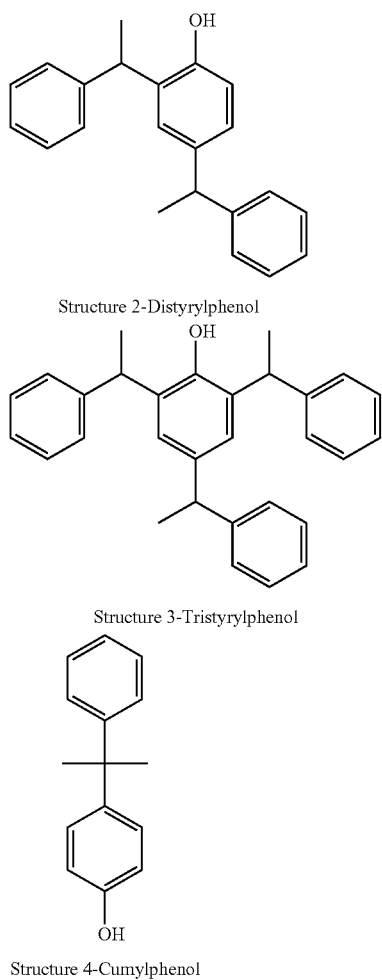

Structure 2-Distyrylphenol

Structure 3-Tristyrylphenol

Structure 4-Cumylphenol

These hydrophobes may be converted into surfactants by methods known in the art such as ethoxylation (nonionic), or by ethoxylation followed by either phosphation or sulfonation to produce anionic end groups which in turn can be neutralized resulting in a counterion cation of sodium, potassium or ammonium.

It is known that surfactants such as those listed in U.S. Pat. No. 6,221,934 may be employed to render the epoxy component emulsifiable. These are nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks. In this patent, it is explained that these surfactants do not produce good epoxy dispersions for various end use applications. None of these surfactants are known to produce good freeze-thaw properties in epoxy dispersions. No surfactants are mentioned that use distyryl phenol, tristyryl phenol or cumylphenol hydrophobes.

U.S. Pat. No. 6,271,287B1 cites the use of various surfactants employed in epoxy dispersions. These include long-chain alkyl alkali metal sulfosuccinate such as dioctyl sodium sulfosuccinate, sodium lauryl sulfate, sulfosuccinic acid-4-ester with polyethylene glycol dodecyl ether disodium salt, dialkyl disulfonated diphenyloxide disodium salt. None of these surfactants were shown to produce good freeze-thaw properties in epoxy dispersions. None of the surfactants mentioned use distyryl phenol, tristyryl phenol or cumylphenol hydrophobes.

When epoxy dispersions freeze, ice begins to form within the continuous phase. Thereby the continuous phase expands in volume, or, in other words, the emulsion becomes more concentrated. The pressure on the dispersed droplets increases considerably, and the ice crystals can violate the protective surfactant layer around the emulsion particles. This leads to coalescence of the emulsion droplets, destabilization of the dispersion and separation of the water and epoxy, resulting in a poor coating.

It would therefore be an advantage in the art to discover a waterborne epoxy resin with good freeze-thaw stability.

Finally, another of the problems with state-of-the-art hardeners and waterborne epoxy dispersion mixtures used in coatings, adhesives, damping and other products including epoxy cement concrete coatings, coatings for concrete, primers for metal and other applications is that often the pot life (the usable life of a mixture of an epoxy hardener and an epoxy) is correlated strongly to the cure time (time for the applied material to cure). Thus, if the pot life is very long, so is the cure time. However, a long pot life is desired allowing larger batches to be made, while shorter cure times are desired to allow for earlier use of the finished coated product. It is difficult to simultaneously increase pot life while maintaining or decreasing cure time.

There are few options to increase pot life while maintaining or reducing cure time. One such option is to add acetic acid to enhance pot life; this is undesirable since this adds to the VOC (volatile organic compounds) level. VOCs are being reduced or eliminated in current and future coatings formulations. Acetic acid may also add undesired water sensitivity to the final epoxy coating.

It is known that nonyl phenols are used in hardener applications to modify cure time. Nonyl phenols are used in hardeners such as Ancamine 2368 available from Air Products. In epoxy hardener systems, these traditionally are used to increase compatibility with epoxy materials which decreases cure time but also simultaneously decreases pot life, an undesirable combination. These nonyl phenols are also estrogen mimics and are banned for use in coatings and other uses by many countries.

The reaction adduct of 1,3-bis(aminomethyl)cyclohexane (BAC) with ketones is used but produces inconsistent results. Ketimines are the reaction products of ketones and primary aliphatic amines. In the absence of reactive hydrogens, they do not react with epoxy resins. They can be considered blocked amines or latent hardeners, since they are readily hydrolyzed to regenerate the amines. They have low viscosity, long pot lives and cure rapidly when exposed to atmospheric humidity, and are useful in high solids coatings. Unfortunately, these cannot be used in waterborne coatings due to premature unblocking with water. They also contribute to VOCs and require an added step in the formulation of hardeners.

U.S. Pat. No. 6,271,287B1 cites the use of various surfactants employed in epoxy dispersions. These include long-chain alkyl alkali metal sulfosuccinate such as dioctyl sodium sulfosuccinate, sodium lauryl sulfate, sulfosuccinic acid-4-ester with polyethylene glycol dodecyl ether disodium salt, dialkyl disulfonated diphenyloxide disodium salt. None of these surfactants were shown to produce improved combination of long pot life and short cure times. None of the surfactants mentioned use distyryl phenol, tristyryl phenol or cumylphenol hydrophobes.

It would therefore be an advantage in the art to discover an ingredient in a hardener that would simultaneously increase pot life while maintaining or decreasing cure time.

Distyryl phenol, tristyryl phenol or cumylphenol based additives have not been cited in the patent literature or other published literature for use in producing epoxy resin hardeners. These distyryl phenol, tristyryl phenol or cumylphenol based additives have surprisingly been found to improve both the pot life and cure times of epoxy/hardener systems. Pot life can be increased while cure time is maintained or decreased.

SUMMARY OF THE INVENTION

Epoxy resins contain the reactive oxirane ring structure commonly called "epoxy." Epoxy resins react spontaneously with carboxylic acids, amines, amides, and mercaptans (thiols). Epoxy resins react slowly with anhydrides, alcohols, phenols, and other epoxy resins. All of these materials are used commercially to cure epoxy resins for a wide variety of end uses. Catalysts (tertiary amines, amine salts, boron trifluoride complexes, etc.) are sometimes used to accelerate the slower reactions.

It would be beneficial to find a way to reduce or eliminate solvents such as benzyl alcohol from these mixtures, while maintaining a reduced viscosity and reducing or eliminating amine blush (the reaction of an amine with atmospheric carbon dioxide) which can cause intercoat adhesion issues.

Mixtures of epoxy resins and hardeners often utilize solvents such as benzyl alcohol to reduce viscosity and improve flow and compatibility with various ingredients in the mixture, especially between the amine and epoxy. Surprisingly, it was found that substituting benzyl alcohol with certain distyryl phenol, tristyryl phenol, or cumylphenol-based hydrophobes by themselves or in the form of nonionic or anionic surfactants, the viscosity of epoxies and the resulting mixtures with hardeners were reduced as well as reducing the amine blush.

Surprisingly it has also recently been found that by using certain distyryl phenol, tristyryl phenol or cumylphenol based additives including in nonionic or anionic surfactants, the pot life and cure times of epoxy and hardener mixtures can be modified. This occurs not only with traditional solvent borne epoxy and hardener mixtures but also for waterborne mixtures in the form of aqueous epoxy resin dispersions. In the case of aqueous epoxy resin dispersions, good long-term stability at room temperature as well as elevated temperatures was obtained. Surprisingly improved freeze-thaw resistance was also obtained for these dispersions.

Epoxy hardeners are used in combination with epoxy resins to produce various products. Traditional hardeners (or curing agents) are often composed of mono, di or multi-functional amines. These may have been pre reacted or modified with a variety of ingredients including epoxies of various types and/or fatty acids, among other ingredients. These ingredients are used to impart compatibility of the amine to the epoxy. They may also impart flexibility, increase cure rates, and improve pot life etc. Other hardeners or curing agent of different chemistries may also be used.

In the present invention, we demonstrate the surprising benefit of modifying hardeners with distyryl phenol, tristyryl phenol or cumylphenol based additives to simultaneously improve both pot life and cure time among other properties.

The instant invention further provides an epoxy composition comprising: (a) at least one epoxy resin; (b) from 0.1 to 20 weight percent, based on epoxy resin of at least one distyryl phenol, tristyryl phenol or cumylphenol-based surfactant with phosphate or sulfonate end groups having the structure:

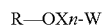

R—OX$n$-W wherein R designates a polystyrylphenol or cumylphenol, preferentially chosen from among distyrylphenol, tristyrylphenol or cumylphenol, and mixtures thereof, and wherein OX designates units derived from ethylene oxide or propylene oxide or a combination of both; n=0 200, and W is selected from the group consisting of H, sulfate (—SO$_3^-$), phosphate (—PO$_3$H or —PO$_2$—OXnR); and (c) optionally water.

The present invention also provides an epoxy hardener composition comprising: (a) at least one epoxy hardener; (b) from 0.1 to 20 weight percent, based on the epoxy resin of a compound having the formula:

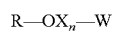

R—OX$_n$—W wherein R is selected from the group consisting of distyrylphenol, tristyrylphenol, polystyrenatedphenol, cumylphenol and mixtures thereof, OX represents units derived from ethylene oxide or propylene oxide or a combination of both; n=0-200, and W is selected from the group consisting of H, sulfate (—SO$_3^-$), phosphate (—PO$_3$H or —PO$_2$—OXnR); and (c) from 0 to 200 parts water based on epoxy hardener.

BRIEF DESCRIPTION OF THE FIGURES

FIG. 1 characterizes the different stages of the cure time from the dry time recorder.

DETAILED DESCRIPTION OF THE INVENTION

Viscosity Reduction and Pot Life/Cure Time for Epoxy Systems

The most commonly used epoxy resins are derivatives of bisphenol A and epichlorohydrin. However, other types of epoxy resins such as Bisphenol AP epoxy, Bisphenol AF epoxy, Bisphenol B epoxy, Bisphenol BP epoxy, Bisphenol C epoxy, Bisphenol E epoxy, Bisphenol F epoxy, Bisphenol G epoxy, Bisphenol M epoxy, Bisphenol S epoxy, Bisphenol P epoxy, Bisphenol PH epoxy, Bisphenol TMC epoxy, Bisphenol Z epoxy and mixtures thereof are also common to achieve various properties. Resins are also available in various molecular weights, to provide unique properties. Epoxy molecular weights of about 300 are generally liquid at room temperature; those of 500 molecular weight are semi solid, while those of 700 and above are solid in the absence of solvent. Molecular weights much higher than those listed are also used.

Another family of epoxy resins also include hybrids such as epoxy alkyds, epoxy acrylics, epoxy silicone, epoxy silane, epoxy polyurethane, epoxy urethanes and other modifications known in the art.

Applicant has unexpectedly found that by using certain distyryl phenol, tristyryl phenol or cumylphenol based products as additives to epoxy resins that the viscosity has been reduced and the pot life and cure time modified as well as the amine blush reduced or eliminated.

In the present invention, various additives were evaluated for their ability to reduce the viscosity of neat epoxy resins in comparison to benzyl alcohol. Benzyl alcohol is traditionally used to lower viscosity in solvent epoxy applications. Benzyl alcohol is also used to improve epoxy reactions by compatibilizing the amine hardener and epoxy. This also helps reduce amine blush.

There is an industry push to move away from VOC containing coatings. It is suggested that the DSP or TSP hydrophobe would have good compatibility with epoxies normally used in this application since their structures are similar to BPA epoxies.

A typical viscosity for epoxy coatings is around 2000-4000 cps. This traditionally requires around 10% benzyl alcohol for viscosity reduction of the epoxy coating. An alternative VOC free epoxy viscosity modifier would be advantageous and preferential over benzyl alcohol.

Surprisingly it has recently been found that by using certain distyryl phenol, tristyryl phenol or cumylphenol based products as additives to epoxy resins that the viscosity has been reduced and the pot life and cure time modified as well as the amine blush reduced or eliminated.

While not wishing to be bound by conjecture, the following hypothesis is suggested for the exemplary properties imparted by the distyryl phenol, tristyryl phenol or cumylphenol compounds Upon examination of their structures (structures 2, 3 and 4 below) it is readily apparent that these structures are very similar to that of epoxy resins shown in the structure above (structure I). It is hypothesized that the similarity in structure provides for superior molecular mixing with the epoxy, in turn allowing for better modification of pot life and cure time as well as clarity of the resultant cured product.

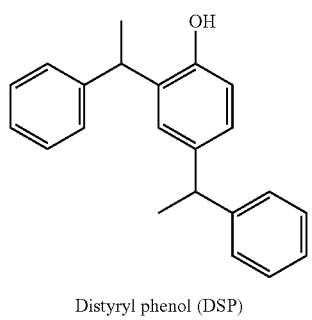

Distyryl phenol (DSP)

Structure 2

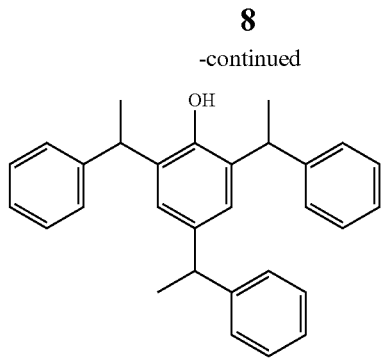

Tristyryl phenol (TSP)

Structure 3

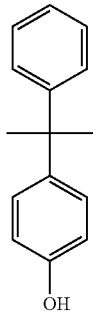

OH

Cumylphenol

Structure 4

The additives, derived from the above hydrophobes have the following structure:

$$R-OX_n-W$$

wherein R designates a polystyrylphenol or cumylphenol, preferentially chosen from among distyrylphenol, tristyrylphenol or cumylphenol, and mixtures thereof, and where X designates units derived from either ethylene oxide or propylene oxide or combinations of both. The number of groups "n" varies from 0 to 200, and where W optionally designates H, sulfate ($-SO_3^-$) or phosphate ($-PO3H$ or $-PO2-OX_nR$).

Commercially available distyrenated phenol is a blend of mono-, di-, and tristyrenated phenol, with distyrenated phenol being the major component.

EXAMPLES

Use of Additives to Reduce Viscosity, Improve Coating Clarity, and Extend the Pot Life to Cure Time Ratio Example I A bisphenol A-based liquid epoxy resin from Hexion/Momentive, EPON 828, viscosity 15,300 cps, was used for the epoxy. The additives used in this study are listed in the table 1 below. Note that NP indicates nonyl phenol.

TABLE 1

| Additive | Hydrophobe | Moles of EO | Percent solids |
|---|---|---|---|
| Benzyl alcohol | — | — | — |
| DSP | DSP | 0 | 100 |
| DSP 5 | DSP | 5 | 100 |
| TSP 15/7 | DSP | 15.7 | 100 |
| TSP | TSP | 0 | 100 |

TABLE 1-continued

| Additive | Hydrophobe | Moles of EO | Percent solids |
|---|---|---|---|
| TSP 5 | TSP | 5 | 100 |
| TSP 10 | TSP | 10 | 100 |
| NP | NP | 0 | 100 |
| NP4 | NP | 4 | 100 |

The liquid epoxy resin was added to a small paint can followed by the appropriate amount of additive. The mixture was mixed without entraining air with a stainless steel three blade mixer for approximately 15-20 minutes. All reagents were stored and mixed at constant temperature (23° C.).

Viscosities of epoxy and additive mixtures were determined using a Brookfield RV viscometer, spindle #6, 4 RPM. All viscosities were determined at constant temperature (23° C.).

Example II

Hardener Adduct Preparation for Cure Time Data

A 4:1 XTA adduct (XTA from Hexion—60-100% 1,3 bis-(aminomethyl)cyclohexane, 13-30% imino-bes(4 amino methyl-4'-cyclohexylmethyl)amine, and 1-3% 3-azabicyclo [3.2.2]nonane was made by adding 400 grams of XTA to a large glass jar. Next, 100 grams of epoxy was added to the jar. A stainless steel two blade stirrer was added to the jar and topped with a lid with a hole that allowed the stirrer shaft to protrude through and rotate freely. The adduct was allowed to stir and react for 8 hours at RT. The final calculated AHEW was 48.6.

Example III

Epoxy Hardener Mixtures

Using the epoxy equivalent weight of the epoxy dispersion and the active hydrogen equivalent weight of the hardener, the appropriate amounts of the epoxy dispersion and hardener are added at a 1:1 equivalents ratio to a small paint can (¼ pint) and mixed with a stainless steel three blade mixer for approximately one minute and then immediately used to determine cure time. This is shown in table 2 below.

TABLE 2

| Additive percent | Additive amount | Epoxy (grams) | XTA adduct (grams) |
|---|---|---|---|
| 0 | 0 | 100 | 25.9 |
| 9 | 9 | 91 | 23.5 |
| 23 | 23 | 77 | 19.9 |

Example IV

Pot Life Determination

To determine pot life, the mixture of epoxy, additive and hardener was immediately subjected to an RV Brookfield Digital Viscometer. A number 6 spindle is used set at 4 RPM to minimize any shear thinning effects. The initial viscosity is recorded and then subsequently every 5 minutes along with the temperature of the mixture obtained by a thermocouple inserted into the mixed system. The pot life is defined as the time required for the initial viscosity to double.

Cure Time Determination

Cure times were determined using a BYK dry time recorder. 1:1 equivalent epoxy hardener mixtures were drawn down on acrylic plastic slides using a 150 micron (~5 mil) draw down cube. The recorder was set for 24 hours and the samples were evaluated in duplicate. A needle slides across the slide over the 24 hour period. This creates the characteristic data shown in FIG. 1 which characterizes the different stages of the cure time from the dry time recorder.

The description of the different phases (phases 1-5-circled numbers) as shown in FIG. 1 area as follows:

(1) During the early stages of drying, the coating tends to flow back into the wake of the stylus. Solvent is evaporating.

(2) When the tendency of the flow has ceased, the film may be considered set. The epoxy amine reaction takes place at this time which also increases Mw to build viscosity. A thumb print will show on the surface, but no epoxy will come off on your thumb.

(3) As the drying process continues, a skin will form. Visually, this part of the film formation is seen when the stylus begins to tear the surface of the film. The film may be considered surface dry or dust free when the skin is no longer ruptured by the stylus.

(4) There is a surface trace from the stylus contact.

(5) It is considered through dry when the stylus rides above the film.

The description of end Points 1 to 5 (Numbers at bottom of FIG. 1)

End of 2—Set to touch (also described as tack free or thin film set)

End of 4—Surface dry (also called dust free or cotton free)

End of 5—Through dry

The data recorded is the final cure of the epoxy film (point 5—Through dry).

Example V

Results for Viscosity Reduction and Pot Life/Cure Time Modification

The epoxy solution viscosity was measured as was the epoxy solution with amine hardener. Pot life and cure time for each mixture was measured and the pot life to cure time ratio calculated. Higher ratios are better allowing for longer application time. It is obvious that most additives reduce the viscosity of the epoxy as well as improved the pot life to cure time ratio to some extent over the benzyl alcohol control. Note also the DSP improves clarity and is much better than the current benzyl alcohol solvent.

The viscosity, pot life and cure time data are presented in the following table. Each additive was added to the epoxy at 9 and 23%. The epoxy solution viscosity was measured as was the epoxy solution with amine hardener. Pot life and cure time for each mixture was measured and the pot life to cure time ratio calculated. Higher ratios are better allowing for longer application time. It is obvious that most additives reduce the viscosity of the epoxy as well as improved the pot life to cure time ratio to some extent over the benzyl alcohol control. Note also the DSP improves clarity and is much better than the current benzyl alcohol solvent.

Table 3 below shows the impact of additives on viscosity, pot life, cure time and film clarity.

The various surfactants were chosen to demonstrate the common hydrophobes used in the dispersion of epoxies.

TABLE 3

| | Additive | % | Epoxy Mixture Visc. (Cps) | Epoxy amine mixture – Initial Visc. (Cps) | Pot life (hrs) | Cure time (hrs) | Pot life:cure time ratio | Film clarity |
|---|---|---|---|---|---|---|---|---|
| 1 | None | 0 | 12,000 | 2,500 | 0.61 | 3.3 | 0.18 | hazy |
| 2 | BA | 9 | 2,500 | 2,500 | 0.28 | 3.4 | 0.08 | hazy |
| 3 | BA | 23 | 1,500 | 1,000 | 0.12 | 2.55 | 0.05 | hazy |
| 4 | DSP | 9 | 20,000 | 5,500 | 0.36 | 2.5 | 0.14 | slightly hazy |
| 5 | DSP | 23 | 32,000 | 8,000 | 0.20 | 2.55 | 0.08 | clear |
| 6 | DSP5 | 9 | 13,000 | 4,000 | 0.71 | 5.1 | 0.14 | hazy |
| 7 | DSP5 | 23 | 9,000 | 4,500 | 1.04 | 6.85 | 0.15 | slightly hazy |
| 10 | DSP15.7 | 9 | 10,000 | 3,500 | 0.76 | 7.25 | 0.10 | hazy |
| 11 | DSP15.7 | 23 | 5,500 | 2,500 | 1.22 | 9.5 | 0.13 | hazy |
| 12 | TSP | 9 | 32,000 | 8,000 | 0.54 | 3 | 0.18 | slightly hazy |
| 13 | TSP | 23 | 48,000 | 13,000 | 0.37 | 2.75 | 0.13 | slightly hazy |
| 14 | NP | 9 | 9,500 | 2,300 | 0.23 | 2 | 0.11 | hazy |
| 15 | NP | 23 | 6,000 | 4,000 | 0.07 | 1.7 | 0.04 | clear |
| 16 | NP4 | 9 | 7,500 | 3,500 | 0.72 | 5.5 | 0.13 | hazy |
| 17 | NP4 | 23 | 3,500 | 3,000 | 0.99 | 7.25 | 0.14 | slightly hazy |

Waterborne Epoxies

Another embodiment of the invention relates to waterborne epoxies. The prior art is silent on the use of Distyryl phenol, tristyryl phenol or cumylphenol based surfactants for use in the manufacture of waterborne epoxies. Surprisingly the above surfactants improved the stability of the dispersion, including freeze-thaw resistance. Additionally, these distyryl phenol, tristyryl phenol or cumylphenol based surfactants have been found to provide excellent stability at room temperature and elevated storage temperature.

While not wishing to be bound by conjecture, the following hypothesis is suggested for the exemplary properties imparted by the distyryl phenol, tristyryl phenol or cumylphenol hydrophobes.

Upon examination of their structures (Structures 2, 3 and 4 above) it is readily apparent that these structures are very similar to that of epoxy resins shown in the structure above (Structure 1). It is hypothesized that the similarity in structure provides for superior adsorption and absorption onto or into the epoxy used in the dispersion by the surfactants produced from these hydrophobe structures. This compatibility is thought to result in greater stability of the dispersion, improving overall properties of the dispersion and subsequent coating properties.

Examples of Improved Waterborne Epoxy Resin Stability

Example VI

The epoxy dispersions were created at 75% solids using 0.5% by weight surfactant based on epoxy. Into a 600 mL beaker was added to the appropriate amount of surfactant (Table 4). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. The resultant dispersion was transferred to a 16 oz jar and capped.

These include lauryl, nonyl phenol, and dioctyl maleate hydrophobes. Each surfactant end group was a sulfate. One surfactant also employed ethylene oxide. These were compared to a distyryl phenol based surfactant with ethylene oxide and a sulfate end group.

TABLE 4

| Surfactant | Supplier | Surfactant solids (%) | Surfactant added (g) |
|---|---|---|---|
| Sodium lauryl sulfate | Rhodia | 29.5 | 5.08 |
| Nonylphenol (4 moles EO) Sulfate (NH4) | Cytec | 31 | 4.84 |
| Sodium dioctyl sulfosuccinate | Cytec | 70.5 (in propylene glycol) | 2.13 |
| DSP 20 moles EO Sulfate (NH4) | Ethox | 50 | 3 |

Shelf Stability Results for Example VI

The results of the 75% solids shelf stability test are shown below in Table 5. The nonyl phenol based surfactant showed separation of the epoxy from the rest of the dispersion at the bottom of the flask after 1 month. This was expressed as a semi translucent phase. After two months, both sodium lauryl sulfate and the nonyl phenol based surfactants showed separation. The results for both the sodium dioctyl sulfosuccinate and distyryl phenol based surfactant demonstrate good room temperature stability. Note that the sodium dioctyl sulfosuccinate contains about 30% propylene glycol, which is undesirable since it contributes to VOCs and therefore is undesirable.

TABLE 5

| Surfactant | Supplier | 1 month at room temperature | 2 months at room temperature |
|---|---|---|---|
| Sodium lauryl sulfate | Rhodia | one phase | two phases |
| Nonylphenol (4 moles EO) Sulfate (NH4) | Cytec | two phases | two phases |

TABLE 5-continued

| Surfactant | Supplier | 1 month at room temperature | 2 months at room temperature |
|---|---|---|---|
| Sodium dioctyl sulfosuccinate (in 30% PG) | Cytec | one phase | one phase |
| Sodium dioctyl sulfosuccinate (in 30% PG) | Ethox | one phase | one phase |

Example VII

The epoxy dispersions were created at 75% solids using 0.5% by weight surfactant based on epoxy. Into a 600 mL beaker was added to the appropriate amount of surfactant (Table 4). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. Part of the resultant dispersion was transferred to a 10 ml jar, capped and tested for freeze thaw resistance.

Freeze Thaw Results for Example 2

The 10 ml samples from example 2 were place in a −20 C freezer overnight. The next day they were removed and allowed to thaw (Table 6). All samples expect the distyryl phenol based sample from Ethox showed a significant layer of water on the surface indicating phase separation and failure of the freeze/thaw test. The samples that exhibited phase separation also did not flow when the container was tipped on its side indicating coagulation of the dispersion.

TABLE 6

| Surfactant | Supplier | Freeze thaw cycles passed | Flow |
|---|---|---|---|
| Sodium lauryl sulfate | Rhodia | none | none |
| Nonylphenol (4 moles EO) Sulfate (NH4) | Cytec | none | none |
| Sodium dioctyl sulfosuccinate (in 30% PG) | Cytec | none | poor |
| DSP 20 moles EO Sulfate (NH4) | Ethox | at least one | normal |

Example VIII

The epoxy dispersions were created at 75% solids using 0.5% by weight surfactant based on epoxy. Into a 600 mL beaker was added to the appropriate amount of surfactant (Table 4). To this was added 300 g of epoxy (EPON 828—Hexion/Momentive). Subsequently about 100 g of water was added to ensure the solids of the final dispersion was 75% by weight epoxy. Finally, the ingredients were mixed using a Dispersator from Premier Mill Corp (FIG. 4) at 40% power for 3 minutes. These were then further diluted to 50% solids. To a 100 ml graduated cylinder was added 75 ml of the mixture and capped with polyethylene film. These samples were then put into a 50 C oven for 2 months.

Heat Age Results for Example VIII

The results of the 50% solids heat age test at 50° C. are shown below in Table 7. After 2 months the sodium lauryl sulfate and the nonyl phenol based surfactant showed separation. The results for both the sodium dioctyl sulfosuccinate and distyryl phenol based surfactant demonstrate good elevated temperature stability. Note that the sodium dioctyl sulfosuccinate contains about 30% propylene glycol which is undesirable since it contributes to VOC's and therefore is undesirable in epoxy dispersions.

TABLE 7

| Surfactant | Supplier | 2 months at 50 C. |
|---|---|---|
| Sodium lauryl sulfate | Rhodia | two phases |
| Nonylphenol (4 moles EO) Sulfate (NH4) | Cytec | two phases |
| Sodium dioctyl sulfosuccinate (in 30% PG) | Cytec | one phase |
| DSP 20 moles EO Sulfate (NH4) | Ethox | one phase |

Example IX

Further experiments were performed on epoxy dispersions for freeze thaw. Dispersions were created at 75% solids using 0.8 by weight solids DSP 20 moles EO Sulfate (NH4) surfactant and 4% of DSP 20 moles EO based on epoxy. Into a 600 mL beaker was added to the appropriate amount of surfactant (Table 8). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. Part of the resultant dispersion was transferred to a 50 ml jar, capped and tested for freeze thaw resistance. The dispersion passed 5 freeze thaw cycles.

TABLE 8

| Surfactant | Supplier | Surfactant solids (% in water) | Surfactant added (g) |
|---|---|---|---|
| DSP 20 moles EO | Ethox | 50% | 24 |
| DSP 20 moles EO Sulfate (NH4) | Ethox | 50% | 4.8 |

Production of Improved Epoxy Hardener Mixtures

In a further embodiment of the invention we provide improved epoxy hardener mixtures. The prior art is silent on the use of Distyryl phenol, tristyryl phenol or cumylphenol based surfactants for use in producing epoxy resin hardeners. These distyryl phenol, tristyryl phenol or cumylphenol based surfactants have surprisingly been found to improve both the pot life and cure times of epoxy/hardener systems. Pot life can be increased while cure time is maintained or decreased.

While not wishing to be bound by conjecture, the following hypotheses are suggested for the exemplary properties imparted by the distyryl phenol, tristyryl phenol or cumylphenol containing surfactants. The large, bulky hydrophobes are not expected to be as mobile as alternative hydrophobes, possibly due to their strong affinity to each other due to the benzylic character of the hydrophobes. This reduced mobility results in slower flow of amines from the micelles produced when the surfactant/hardener mixture is dispersed into water. The surfactants may also delay transport of the amine hardener to the dispersed epoxy when mixed, due to the hydrophobes affinity to the amine hardener, especially when amine adducts are used as hardeners.

Finally, another of the problems with state-of-the-art hardeners and waterborne epoxy dispersion mixtures used in coatings, adhesives, damping and other products including epoxy cement concrete coatings, coatings for concrete, primers for metal and other applications is that often the pot life (the usable life of a mixture of an epoxy hardener and an epoxy) is correlated strongly to the cure time (time for the applied material to cure). Thus, if the pot life is very long, so is the cure time. However, a long pot life is desired allowing larger batches to be made, while shorter cure times are desired to allow for earlier use of the finished coated product. It is difficult to simultaneously increase pot life while maintaining or decreasing cure time. Compositions of the invention.

A variety of hardeners or curing agents are available to cure the epoxy compositions of the invention. Curing may be achieved by reacting an epoxy with polyfunctional curatives or hardeners. In principle, any molecule containing a reactive hydrogen may react with the epoxide groups of the epoxy resin. Common classes of hardeners for epoxy resins include aliphatic amines cycloaliphatic amines, aromatic amines, acids, acid anhydrides, dicyandiamide, polysulfides, isocyanates, melamine-formaldehyde, urea-formaldehyde and phenol-formaldehyde.

Relative reactivity (lowest first) is approximately in the order: phenol<anhydride<aromatic amine<cycloaliphatic amine<aliphatic amine<thiol. General classes of amine hardeners are as follows: mannich bases and phenalkylamines, polyetheramines, ethyleneamines and their adducts, polyamides and amidoamines, arylyl diamines, cycloaliphatic amines, and aromatic amines.

The epoxy curing reaction may be accelerated by addition of small quantities of accelerators. Tertiary amines, carboxylic acids and alcohols (especially phenols) are effective accelerators. Bisphenol A is a highly effective and widely used accelerator, but is now increasingly replaced due to health concerns with this substance.

Examples of Improved Pot Life and Cure Times by Adding Sulfated Styrenated Phenol Surfactants to Hardener and Mixing with a Waterborne Epoxy Dispersion.

Materials

A BPA based epoxy resin from Hexion/Momentive, EPON 828, is used for the epoxy dispersion. BAC from Mitsubishi Gas Chemicals is used in making a 4:1 BAC: epoxy adduct. The surfactants used in this study are listed in Table 9 below.

TABLE 9

| surfactant | hydrophobe | Moles of EO | charge | solids | HLB |
|---|---|---|---|---|---|
| Tergitol NP15 | NP | 15 | non-ionic | 100 | 15 |
| Tergitol NP30 | NP | 30 | non-ionic | 100 | 17 |
| Tergitol S20 | secondary alcohol | 20 | non-ionic | 100 | 16 |
| E-Sperse 703 | DSP | 20 | non-ionic | 100 | 14 |
| E-Sperse 1689 | TSP | 10 | non-ionic | 100 | 9.6 |
| Tergitol S40 | secondary alcohol | 40 | non-ionic | 70 | 18 |
| Aerosol OT-70 | dioctyl maleate | — | Sulfate (Na) | 70 | — |
| E-Sperse 704 | DSP | 20 | Sulfate (NH4) | 50 | — |

HLB is hydrophile/lipophile balance. For nonionic surfactants, it is determined by dividing the weight percent of ethylene oxide units in the surfactant by five. Higher numbers mean higher water solubility.

Example X

Epoxy Dispersion

A master batch of epoxy dispersion was created at 72% solids using 5% by weight E-Sperse 704 based on epoxy. Into a large stainless steel beaker was added to the appropriate amount of surfactant. To this was added epoxy (EPON 828—Hexion/Momentive). Subsequently water was added to ensure the solids of the final dispersion was 72% by weight epoxy. Finally, the ingredients were mixed using a Dispersator from Premier Mill Corp at 40% power for 3 minutes. The resultant dispersion was transferred to a gallon container.

Hardener Adduct Preparation

A 4:1 BAC (1,3 bis-(aminomethyl)cyclohexane) epoxy adduct was made by adding 400 grams of BAC to a large glass jar. Next, 100 grams of epoxy was added to the jar. A stainless steel two blade stirrer was added to the jar and topped with a lid with a hole that allowed the stirrer shaft to protrude through and rotate freely. The adduct was allowed to stir and react for 8 hours at RT.

To the hardeners was added the appropriate surfactant (see Table 11).

Ancamine 401 (a commercial hardener product form Air Products) was also tested. E-Sperse 703 was used to test pot life and cure time. (See table 11 below)

Epoxy Hardener Mixtures

Using the epoxy equivalent weight of the epoxy dispersion and the active hydrogen equivalent weight of the hardener, the appropriate amounts of the epoxy dispersion and hardener are added at a 1:1 equivalents ratio to a small paint can (¼ pint) and mixed with a stainless steel three blade mixer for approximately one minute and then immediately used to determine cure time.

Pot Life Determination

To determine pot life, a mixed 2K system is immediately subjected to an RV Brookfield Digital Viscometer. A number 6 spindle is used set at 4 RPM to minimize any shear thinning effects. The initial viscosity is recorded and then subsequently every 5 minutes along with the temperature of the mixture obtained by a thermocouple inserted into the mixed system. The pot life is defined as the time required for the initial viscosity to double.

Cure Time Determination

Cure times were determined using a BYK dry time recorder as described earlier.

Results and Discussion

Table 10 shows the components of the individual hardeners prepared and tested for cure time in waterborne epoxy dispersions. Unshaded indicates a neat water dispersible hardener while shading indicates a water borne hardener. Waterborne indicates the presence of water in the hardener while water dispersible indicates no water present initially however it is dispersible after the fact into water.

TABLE 10

Hardener Compositions

| surfactant | 4:1 BAC (g) | Solids | Surfactant added (g) | AHEW | Viscosity (cps) | phr | Overall % surfactant on epoxy | % surfactant in hardener |
|---|---|---|---|---|---|---|---|---|
| Tergitol NP15 | 25 | 100 | 18.8 | 75.7 | 500 | 30.2 | 12.9 | 42.9 |
| Tergitol S20 | 25 | 100 | 18.8 | 75.7 | 750 | 30.2 | 12.9 | 42.9 |
| E-Sperse 703 | 25 | 100 | 18.8 | 75.7 | wax | 30.2 | 12.9 | 42.9 |
| Tergitol NP30 | 25 | 100 | 18.8 | 75.7 | wax | 30.2 | 12.9 | 42.9 |
| E-Sperse 1689 | 25 | 100 | 18.8 | 75.7 | 500 | 30.2 | 12.9 | 42.9 |
| Tergitol NP15 | 25 | 50 | 37.5 | 108.1 | 250 | 43.1 | 12.9 | 30.0 |
| Tergitol S20 | 25 | 50 | 37.5 | 108.1 | 250 | 43.1 | 12.9 | 30.0 |
| E-Sperse 703 | 25 | 50 | 37.5 | 108.1 | 250 | 43.1 | 12.9 | 30.0 |
| Tergitol S40 | 25 | 70 | 26.8 | 89.6 | 500 | 35.7 | 12.9 | 36.2 |
| Aerosol OT-70 | 25 | 70 | 26.8 | 89.6 | 3750 | 35.7 | 12.9 | 36.2 |
| E-Sperse 704 | 25 | 50 | 37.5 | 108.1 | 250 | 43.1 | 12.9 | 30.0 |

AHEW is adduct hardener equivalent weight; phr is pounds per hundred rate

Note in Table 10 that in the epoxy dispersion, the amount of surfactant (E-Sperse 704) is 5% based on weight solids of epoxy. When the hardener is added, the amount of surfactant based on epoxy in the mixture becomes 17.9% based on weight solids of epoxy. Surfactant in the overall is mixture is approximately 12-14%.

Pot Life and Cure Time Data

Table 11 shows the results of cure time testing for the different hardeners. For comparison, through dry time has been set at 24 hours for films that did not cure after 24 hours. A long pot life and short cure time are desirable. As can be seen, E-Sperse 704 has the best combination of properties.

TABLE 11

Cure Time and Pot Life Data

| surfactant | Pot life (hrs) | Through Dry (hrs) | Pot life to Cure Time Ratio |
|---|---|---|---|
| Tergitol NP15 | 0.08 | 6 | 0.013 |
| Tergitol S20 | 0.17 | 8.5 | 0.020 |
| E-Sperse 703 | 0.18 | 24 | 0.008 |
| Tergitol NP30 | 0.18 | 7.1 | 0.025 |
| E-Sperse 1689 | 0.18 | 5.8 | 0.031 |
| Tergitol NP15 (50%) | 0.28 | 10.8 | 0.026 |
| Tergitol S20 (50%) | 0.27 | >24 | 0.011 |
| E-Sperse 703 (50%) | 0.47 | >24 | 0.020 |
| Tergitol S40 (70%) | 0.25 | >24 | 0.010 |
| Aerosol OT-70 (70%) | 0.28 | 4.5 | 0.062 |
| E-Sperse 704 (50%) | 0.47 | 5.8 | 0.081 |

Table 11 shows the pot life data compared to the through dry time reported in this report. It is clear that E-Sperse 704 offers the best combination of long pot life and fast cure time by the highest ratio of pot life to cure time.

Ancamine 401 was also tested with and without E-Sperse 703 surfactant to determine pot life and cure time effects of added E-Sperse 703 on a commercial product. Note in Table 12 that in the epoxy dispersion, is a 72% epoxy and the surfactant (E-Sperse 704) is 5% based on weight solids of epoxy. The E-Sperse 703 was 42% of the total E-Sperse 703 and Ancamine 401 mixture. In this case the pot life was greatly extended. Note also the viscosity reduction of Ancamine 403 and the epoxy mixture.

TABLE 12

Pot life/cure time data

| Surfactant used | E-Sperse 703 | None |
|---|---|---|
| Hardener | Ancamine 401 | Ancamine 401 |
| AHEW of surfactant hardener mixture | 350 | 200 |
| PHR Ancamine 401 added based on epoxy dispersion | 139.6 | 79.8 |
| Initial viscosity cps | 3000 | 18500 |
| Time for viscosity doubling - Pot life (minutes) | 35 | 20 |
| Cure time - hours | 3 | 2 |

The contents of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

This application was filed on Mar. 9, 2013, by Isaac A. Angres, Reg. No. 29,765.

What is claimed is:

1. An epoxy composition comprising:
   (a) at least one epoxy resin;
   (b) from 0.1 to 20 weight percent, based on the epoxy resin of a compound having the formula:

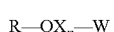

R—OX$_n$—W wherein R is selected from the group consisting of distyrylphenol, tristyrylphenol, polystyrenated phenol, and mixtures thereof, OX represents units derived from ethylene oxide or propylene oxide or a combination of both; n=5-15.7, and W is selected from the group consisting of H, sulfate (—SO$_3^-$), and phosphate (—PO$_3$H or —PO$_2$—OXnR); and
   (c) wherein said epoxy resin and said compound are dispersed in water.

2. The epoxy composition of claim 1 wherein the epoxy is selected from the group consisting of Bisphenol A epoxy, Bisphenol AP epoxy, Bisphenol AF epoxy, Bisphenol B epoxy, Bisphenol BP epoxy, Bisphenol C epoxy, Bisphenol E epoxy, Bisphenol F epoxy, Bisphenol G epoxy, Bisphenol M epoxy, Bisphenol S epoxy, Bisphenol P epoxy, Bisphenol PH epoxy, Bisphenol TMC epoxy, Bisphenol Z epoxy and mixtures thereof.

3. The epoxy composition of claim 1 which is capable of forming a dispersion in water.

4. The epoxy composition of claim 3, wherein the epoxy resin is an epoxy hybrid selected from the group consisting of epoxy alkyd, epoxy acrylic, epoxy silicone, epoxy silane, epoxy polyurethane, and epoxy polyurea.

5. A coating composition comprising the composition of claim 1.

6. An adhesive composition comprising the composition of claim 1.

7. A dampening composition comprising the composition of claim 1.

8. A potting composition comprising the composition of claim 1.

9. An epoxy concrete cement composition comprising the composition of claim 1.

10. An epoxy composition comprising:
(a) at least one epoxy resin;
(b) from 0.1 to 20 weight percent, based on the epoxy resin of a compound having the formula:

R—OX$_n$—W wherein R is selected from the group consisting of distyrylphenol, tristyrylphenol, polystyrenated phenol, and mixtures thereof, OX represents units derived from ethylene oxide or propylene oxide or a combination of both; n=5-15.7, and W is selected from the group consisting of H, sulfate (—SO$_3^-$), and phosphate (—PO$_3$H or —PO$_2$—OXnR); and
(c) water;
wherein said composition is subsequently mixed with an epoxy hardener and optionally at least one pigment to form a liquid reactive system.

11. A composition comprising:
(a) epoxy resin;
(b) at least one epoxy hardener;
(c) from 0.1 to 20 weight percent, based on the epoxy resin of a compound having the formula:

R—OX$_n$—W wherein R is selected from the group consisting of distyrylphenol, tristyrylphenol, polystyrenated phenol, and mixtures thereof, OX represents units derived from ethylene oxide or propylene oxide or a combination of both; n=5-15.7, and W is selected from the group consisting of H, sulfate (—SO$_3^-$), and phosphate (—PO$_3$H or —PO$_2$—OXnR);

(d) from 0 to 200 parts water based on epoxy hardener; and
(e) wherein said composition has a viscosity of 2000-4000 cps.

12. The composition of claim 11, wherein said epoxy hardener is selected from the group consisting of amidoamines, polyamides, aliphatic amines, modified aliphatic amines, cycloaliphatic amines, aromatic amines, anhydrides and ketamines.

13. A composition comprising the composition of claim 11 and a waterborne epoxy.

14. The composition of claim 13, wherein the waterborne epoxy is a waterborne epoxy hybrid.

15. The composition of claim 14 wherein the waterborne epoxy hybrid is selected from the group consisting of an epoxy alkyd, epoxy acrylic, epoxy silicone, epoxy silane, epoxy polyurethane, and epoxy polyurea.

16. The composition of claim 11, wherein the epoxy hardener is diluted with water to produce a composition with a solids content from 5% to 99.99%.

17. A composition comprising the composition of claim 11, and an epoxy resin.

18. The composition of claim 17, wherein the epoxy is an epoxy hybrid.

19. The composition of claim 18, wherein the epoxy hybrid is selected from the group consisting of epoxy alkyd, epoxy acrylic, epoxy silicone, epoxy silane, epoxy polyurethane, and epoxy polyurea.

20. The composition of claim 17, further comprising the incorporation of an ingredient selected from the group consisting of pigments, solvents and other ingredients.

21. The compositions of claim 20, useful for coatings, adhesives, damping compositions, potting compounds, and epoxy cement concrete.

22. The composition of claim 17, wherein said composition has improved pot life and cure time ratio.

23. The composition of claim 17, wherein said composition has improved amine blush.

24. An epoxy composition comprising:
an aqueous dispersion comprising:
at least one epoxy resin; and
from 0.1 to 20 weight percent, based on the epoxy resin of a compound having the formula:

R—OX$_n$—W wherein R is selected from the group consisting of distyrylphenol, tristyrylphenol, polystyrenated phenol, and mixtures thereof, OX represents units derived from ethylene oxide or propylene oxide or a combination of both; n=5-15.7, and W is selected from the group consisting of H, sulfate (—SO$_3^-$), and phosphate (—PO$_3$H or —PO$_2$—OXnR).

* * * * *